Patented Feb. 6, 1945

2,368,623

UNITED STATES PATENT OFFICE 2,368,623

FOAM-GENERATING SUBSTANCES

David John Tresise and Arthur Ferdinand Ratzer, Brentford, England, assignors, by mesne assignments, to Pyrene Development Corporation, Newark, N. J., a corporation of Delaware No Drawing. Application September 2, 1943, Serial No. 500,990. In Great Britain October 1, 1942

5 Claims. (Cl. 252—356)

This invention relates to the production of foam-generating substances such as are largely used for fire-extinguishing purposes. At the present time the most successful type of substance is that described in the patent to Arthur F. Ratzer No. 2,324,951, granted July 24, 1943. This type of substance is produced by degrading proteins with a hydrolysing agent in the form of an alkaline earth metal oxide or hydroxide or magnesium oxide or hydroxide. A soluble salt, usually calcium chloride, is added with the hydrolysing agent, as it is found to improve the foam-generating properties.

In practice the hydrolysis is stopped when it has proceeded to an extent that is somewhat critical and the excess hydrolysing agent is neutralised with sulphuric acid. The usual hydrolysing agent is calcium oxide, and after the neutralisation sodium sulphate is added in order to convert the calcium salt to the sodium salt. The solution is then filtered and concentrated. The resultant product is an excellent foam generator, but it is desirable to add to it an agent which stabilises the foam produced from it; in practice ferrous sulphate is always used as the foam stabiliser.

Although the substances produced in the way described are largely used, they contain ingredients which are not completely removed by the steps described and which sometimes cause a sediment to form and thus may interfere with the efficient operation of the foam-generating apparatus.

An object of this invention is to eliminate or substantially to reduce the tendency of sediment to form in the production of a foam-generating substance of the type in question.

Another object of this invention is to reduce the amount of neutralising agent required.

A further object of this invention is to neutralise excess hydrolysing agent in a particularly effective manner.

Yet another object of the invention is to produce a foam-generating substance which will yield a foam of improved stability.

We have found that the ingredients which cause sediment to form in the existing protein foam-generating substances are sulphates and that the difficulties previously encountered can be overcome by forming only soluble salts during the neutralisation. In our invention excess hydrolysing agent in a hydrolysed protein material that has been hydrolysed by an alkaline earth metal oxide or hydroxide or magnesium oxide or hydroxide is neutralised with an acid which will convert the metal of the hydrolysing agent into a soluble salt. The soluble salt thus produced has the same effect in the finished product as the soluble salt previously added with the hydrolysing agent, so that it is possible to eliminate this soluble salt from the starting materials. The acid we prefer to use is hydrochloric acid, and as calcium oxide is the hydrolysing agent most frequently used the residue of this is converted into calcium chloride.

If a metallic salt is to be added to the product as a stabilising agent the neutralising acid must form soluble salts with the metal of the stabilising agent, and the acid radical of the metallic salt used must form a soluble salt with the hydrolysing agent. However, it is not necessary for the acid radical of the stabilising agent to be the same as that of the neutralising agent. In practice we prefer to use ferrous chloride but since this has a stronger acid reaction than ferrous sulphate care must be taken during neutralisation to prevent the final solution from becoming so acid that the protein is adversely affected.

It is usually desirable to use an excess of hydrolysing agent in order to ensure that the maximum amount of protein is degraded to the desired degree.

In contrast to the existing procedure, we prefer to filter the material before neutralisation, as in this way we reduce both the amount of neutralising agent and the amount of soluble salt produced.

We find that the stability of the foam generated from substances produced according to the invention is materially affected by two factors, namely the pH and the amount of metal introduced by the stabilising agent. We prefer to ensure that the pH lies between 6.5 and 7.0. If the pH is as low as 6.0 the foam tends to be unstable when used for extinguishing burning gasoline, and within the preferred range it is distinctly more stable than outside it. In general, the final product is rendered acid by the addition of ferrous chloride as a foam stabiliser, but as commercial ferrous chloride varies somewhat in its acidity the pH of the product may fall below 6.5 when the ferrous chloride is added, and in such a case we prefer to bring it back into the range 6.5 to 7.0 by the addition of an alkali.

The amount of metal introduced by the stabilising agent should, when an iron salt is used, be from 5 to 10 grams of iron per liter of the final product.

Sodium chloride may, if desired, be added to the foam-generating substances produced according to the invention.

As an example, 2500 lbs. of hoof and horn meal may be mixed with 800 lbs of slaked lime, and 560 British gallons of water, and heated and maintained for six hours at 98° C. The product is filtered and the filtrate neutralised with hydrochloric acid. The mixture is boiled to drive off undesirable gases, concentrated to 40° Tw. and and cooled. A foam stabiliser in the form of a solution containing 3 lbs. per gallon of crystalline ferrous chloride is then mixed in the proportion of 10% by volume with the resultant product, this representing an addition of 7.6 grams of iron per liter. Finally the pH of the product is ascertained and, if necessary, adjusted to lie between 6.5 and 7.0.

We claim:

1. In the production of a foam-generating material, the steps of treating a proteinous material with an excess of a hydrolysing agent selected from the group consisting of calcium oxide and calcium hydroxide, allowing hydrolysis to take place, and neutralising the excess hydrolysing agent with hydrochloric acid.

2. In the production of a foam generating material, the steps of treating a proteinous material with an excess of a hydrolysing agent selected from the group consisting of calcium oxide and calcium hydroxide, allowing hydrolysis to take place, filtering the resultant product, and neutralising the excess hydrolysing agent with hydrochloric acid.

3. In the production of a foam-generating material, the steps of treating a proteinous material with an excess of a hydrolysing agent selected from the group consisting of calcium oxide and calcium hydroxde, allowing hydrolysis to take place, neutralising the excess hydrolysing agent with hydrochloric acid, and adding to the product formed a foam stabilizer comprising an iron salt, having an acid radical capable of forming a soluble salt with said hydrolysing agent, said foam stabiliser providing from 5 to 10 grams of iron per liter of the final product.

4. In the production of a foam-generating material, the steps of treating a proteinous material with an excess of a hydrolysing agent selected from the group consisting of calcium oxide and calcium hydroxide, allowing hydrolysis to take place, neutralising the excess hydrolysing agent with hydrochloric acid, and adding ferrous chloride to the product formed.

5. In the production of a foam-generating material, the steps of treating a proteinous material with an excess of a hydrolysing agent selected from the group consisting of calcium oxide and calcium hydroxide, allowing hydrolysis to take place, filtering the resultant product, neutralising the excess hydrolysing agent with hydrochloric acid, and adjusting the pH of the product formed to pH 6.5 to 7.0.

DAVID JOHN TRESISE.
A. F. RATZER.